United States Patent
Fleming et al.

(10) Patent No.: US 8,182,143 B2
(45) Date of Patent: May 22, 2012

(54) MOBILE TEMPERATURE SENSOR

(75) Inventors: Rex J. Fleming, Boulder, CO (US);
Randy Dean May, Wilmington, NC
(US); W. Stephen Woodward, Chapel
Hill, NC (US)

(73) Assignee: SpectraSensors, Inc., Rancho
Cucamonga, CA (US)

( * ) Notice: Subject to any disclaimer, the term of this
patent is extended or adjusted under 35
U.S.C. 154(b) by 873 days.

(21) Appl. No.: 11/836,588

(22) Filed: Aug. 9, 2007

(65) Prior Publication Data

US 2008/0159354 A1 Jul. 3, 2008

Related U.S. Application Data

(60) Provisional application No. 60/836,710, filed on Aug. 9, 2006.

(51) Int. Cl.
G01K 1/02 (2006.01)
G01K 17/06 (2006.01)
G01K 17/10 (2006.01)
G01K 13/02 (2006.01)

(52) U.S. Cl. ...... 374/138; 374/147; 374/208; 73/170.02

(58) Field of Classification Search .............. 374/1, 141, 374/30, 29, 100, 148, 147, 143, 142, 208, 374/137, 138, 110–112, 115; 702/130
See application file for complete search history.

(56) References Cited

U.S. PATENT DOCUMENTS

| 4,041,757 | A | * | 8/1977 | Baker et al. ................... 73/202.5 |
| 4,152,938 | A | * | 5/1979 | Danninger .................... 374/138 |
| 4,381,668 | A | * | 5/1983 | Sato et al. ..................... 73/202.5 |
| 4,428,231 | A | * | 1/1984 | Peloza .......................... 73/202.5 |
| 4,432,658 | A | * | 2/1984 | Harman et al. ............... 374/138 |
| 4,441,405 | A | * | 4/1984 | Takeuchi ........................ 454/75 |
| 4,609,292 | A | * | 9/1986 | Asano et al. .................. 374/144 |
| 4,668,102 | A | * | 5/1987 | Mott ............................. 374/142 |
| 4,713,765 | A | * | 12/1987 | Abe et al. ...................... 701/103 |
| 5,146,244 | A | * | 9/1992 | Myhre et al. .................. 359/509 |
| 5,311,447 | A | * | 5/1994 | Bonne ............................ 702/50 |
| 5,576,500 | A | * | 11/1996 | Cage et al. ............... 73/861.357 |
| 5,635,635 | A | * | 6/1997 | Tsukada et al. ............ 73/114.34 |
| 5,647,668 | A | * | 7/1997 | Schnaibel et al. ............ 374/144 |
| 5,672,822 | A | * | 9/1997 | Sawada et al. ............... 73/202.5 |
| 6,088,661 | A | * | 7/2000 | Poublon ........................ 702/130 |
| 6,293,494 | B1 | * | 9/2001 | Scherer et al. .............. 244/53 B |
| 6,571,623 | B1 | * | 6/2003 | Blasczyk et al. ........... 73/204.22 |
| 6,668,640 | B1 | * | 12/2003 | Alwin et al. ................ 73/170.02 |
| 6,779,395 | B2 | * | 8/2004 | Hornung et al. ........... 73/204.21 |
| 6,809,648 | B1 | * | 10/2004 | Fleming ....................... 340/601 |
| 6,817,240 | B2 | * | 11/2004 | Collot et al. ............... 73/170.02 |
| 6,997,050 | B2 | * | 2/2006 | Fleming .................... 73/170.01 |

(Continued)

FOREIGN PATENT DOCUMENTS

EP 1602905 12/2005

(Continued)

*Primary Examiner* — Gail Verbitsky
(74) *Attorney, Agent, or Firm* — Mintz, Levin, Cohn, Ferris, Glovsky and Popeo, P.C.

(57) ABSTRACT

Ambient temperature for a temperature sensor can be calculated using a mobile temperature sensor system that samples air from the boundary layer around a mobile platform and passes the air through a measurement cell containing two flush-mounted or embedded sensor elements. A common reference voltage can be applied by control circuitry to minimize drift in the sensor element readings and to calculate the ambient temperature.

9 Claims, 6 Drawing Sheets

U.S. PATENT DOCUMENTS

| | | | |
|---|---|---|---|
| 7,031,871 B2* | 4/2006 | Severson et al. | 702/130 |
| 7,156,552 B2* | 1/2007 | Fleming | 374/141 |
| 7,387,437 B2* | 6/2008 | Brown et al. | 374/141 |
| 7,441,948 B2* | 10/2008 | Bernard et al. | 374/135 |
| 7,490,512 B2* | 2/2009 | Fraden | 73/204.26 |
| 7,524,106 B2* | 4/2009 | Higashiyama et al. | 374/145 |
| 7,588,368 B2* | 9/2009 | Hagen et al. | 374/40 |
| 2002/0184943 A1* | 12/2002 | Collot et al. | 73/170.02 |
| 2003/0196486 A1* | 10/2003 | Zurek et al. | 73/202.5 |
| 2004/0177683 A1* | 9/2004 | Ice | 73/170.02 |
| 2005/0273292 A1* | 12/2005 | Severson et al. | 702/130 |
| 2006/0050767 A1 | 3/2006 | Fleming | |
| 2006/0209921 A1* | 9/2006 | Brown et al. | 374/109 |
| 2008/0285620 A1* | 11/2008 | Benning et al. | 374/138 |
| 2009/0141769 A1* | 6/2009 | Baldwin et al. | 374/144 |
| 2009/0154522 A1* | 6/2009 | Kulczyk | 374/138 |

FOREIGN PATENT DOCUMENTS

| | | |
|---|---|---|
| FR | 2680872 | 3/1993 |
| JP | 59119229 A * | 7/1984 |

* cited by examiner

MOBILE TEMPERATURE SENSOR

RELATED APPLICATION

The present patent application claims priority to U.S. Patent Application Ser. No. 60/836,710, filed on Aug. 9, 2006 and entitled "Mobile Temperature Sensor," the entire disclosure of which is incorporated by reference herein.

TECHNICAL FIELD

The subject matter described herein relates to temperature sensors systems and methods of measuring ambient air temperatures on moving mobile platforms.

BACKGROUND

Total air temperature (TAT) probes used on commercial aircraft have changed very little since their first use on jet aircraft about 50 years ago. The total air temperature measured includes the outside or ambient atmospheric temperature plus the additional heating of the air due to the kinetic energy of the fast moving aircraft. Negative attributes of existing TAT probes can include, but are not limited to, lack of accuracy, the requirement that the probe incorporate a heater, additional drag due to the probe, and the increased radar cross section which can be undesirable for military aircraft.

SUMMARY

In one aspect, an apparatus can include an air intake passage that has an air intake inlet configured to admit ambient air into the air intake passage, a measurement cell through which air from within the air intake passage is diverted, and a first and a second sensor element disposed within the measurement cell. The first sensor element provides a signal that is related to a first temperature measured by the first sensor element and the second sensor element provides a signal that is related to a second temperature measured by the second sensor element. A control circuit configured to receive the first signal and the second signal and to calculate an ambient air temperature of the ambient air admitted into the air intake passage is also included.

In a second interrelated aspect, a method includes passing ambient air from a boundary layer around a mobile platform into an air intake passage, diverting a sample stream of air from the air intake passage to a measurement cell that includes a first sensor element and a second sensor element providing a first and a second signal related to a measurement cell temperature experienced by the first and the second sensor elements, respectively, receiving the signals from the first and the second sensor elements at a circuit, and calculating an ambient temperature of the ambient air using the signals from the two sensor elements.

Optional variations can include one or more of the following features. The apparatus can also optionally include a mobile platform having an exterior surface adjacent to which the air intake inlet is disposed. This mobile platform can optionally be an aircraft. A thermally insulating layer can optionally be disposed around the measurement cell to thermally isolate the measurement cell from the mobile platform. The air intake inlet can optionally be positioned to admit air from within a boundary layer adjacent to the exterior surface of the mobile platform when the mobile platform is in motion. The first sensor element and the second sensor element can optionally be platinum resistance thermometers. The measurement cell can optionally be constructed of aluminum. The control circuit can optionally include a first biasing and conditioning unit that conditions and biases the first signal, a second biasing and conditioning unit that conditions and biases the second signal, and a reference voltage source that normalizes the voltages of the first and the second biasing and conditioning units. An air sampling vent can optionally be configured to divert air from within the air intake passage to the measurement cell. The air intake inlet can optionally be positioned proximate to an exterior surface of a mobile platform such that ambient air from within a boundary layer of air adjacent to the exterior surface passes into the air intake passage. The air intake inlet can optionally be positioned proximate to an exterior surface of a mobile platform such that ambient air from within a boundary layer of air adjacent to the exterior surface passes into the air intake passage. The air intake passage can optionally include a flow enhancer configured to inertially separate particles and other airborne material with a higher density than the ambient air from air diverted into the measurement cell. The first sensor element can optionally be disposed at a first location along an interior surface of the measurement cell and the second sensor element can optionally be disposed at a second location along the interior surface of the measurement cell. The first location can optionally be approximately opposite to the second location across an interior volume of the measurement cell. The first sensor element can optionally be recessed beneath the internal surface and the second sensor can optionally be recessed beneath the internal surface. The recessing distance can optionally be in a range of approximately 5 to 100 microns, or optionally approximately 80 microns.

Among other possible advantages, the subject matter described herein may be used to accurately and reliably measure a broad range of air temperatures experienced by a vehicle such as an aircraft. Drag is reduced relative to currently available sensors. No heater element is required as part of the probe, so reliability is improved greatly over currently available sensor systems.

DESCRIPTION OF THE DRAWINGS

This disclosure may be better understood upon reading the detailed description and by reference to the attached drawings, in which.

Like reference symbols may refer to like elements.

DETAILED DESCRIPTION

Figure 1:
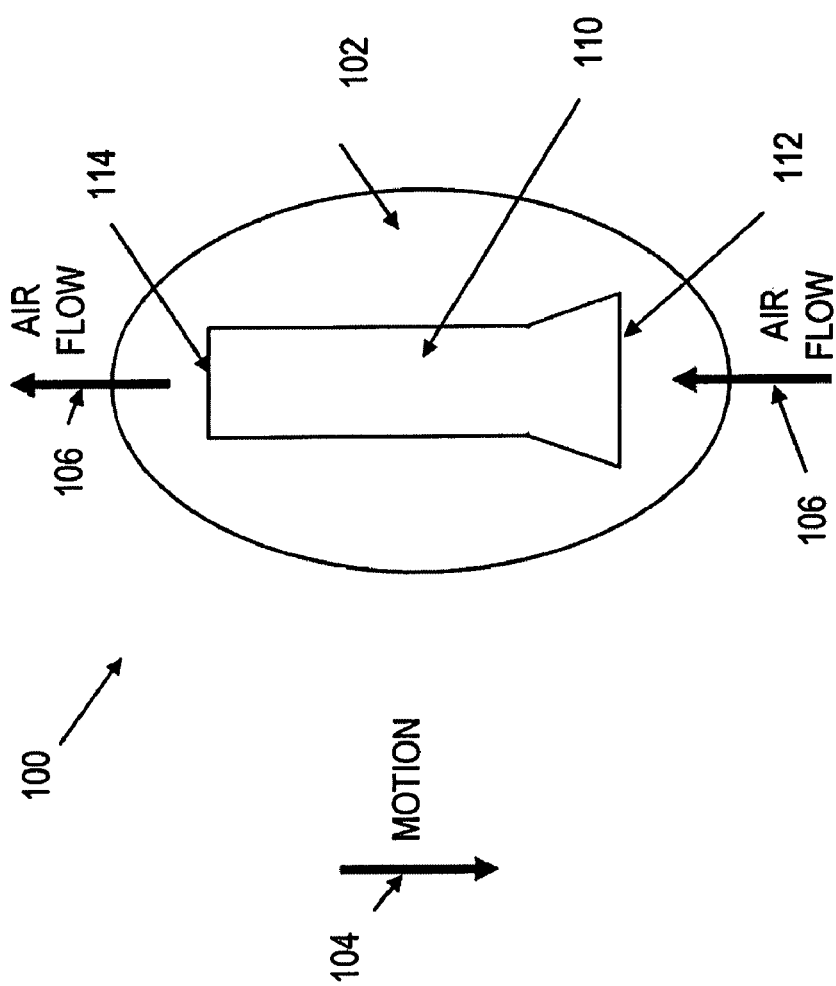
FIG. 1 is a schematic diagram showing a top view of a mobile temperature sensor system.

The presently disclosed subject matter includes methods, techniques, systems, structures, and articles of manufacture that may be used to accurately and reproducibly measure ambient air temperature on a mobile platform such as for example a vehicle like an aircraft.

Fast moving vehicles and other mobile platforms in the atmosphere experience a boundary layer of air that marks the transition between air experiencing friction at the surface of the mobile platform as it moves through the air and free air undisturbed by the passage of the mobile platform. The boundary layer is typically less than three inches, but its thickness can vary based on factors such as airspeed, aerodynamic properties of the mobile platform, air turbulence, and the like. Air within the boundary layer experiences frictional heating caused by a rapidly moving mobile platform such as an aircraft. This frictional heating component must be removed to obtain and accurate ambient atmospheric temperature readings. In general, temperature readings obtained from a sensor mounted on the mobile platform will be warmer than the natural ambient due to the surface skin friction. Air pulled into an air sampler as described herein is generally heated by the proximity to the exterior surface of a mobile platform, but will tend to not experience as much warming relative to the ambient air temperature as the exterior surface itself. However, the skin friction will be the only cause of the temperature difference as the solid measurement cell is isolated from temperatures inside the aircraft and will be protected from possible heat conduction from the outside aircraft skin by a non-heat conducting gasket/insulator between the solid measurement cell and the doubler/filler plates.

To give an accurate measurement of the ambient air temperature, raw readings of temperature sensors of a mobile temperature sensor system can be corrected for the effects of friction. A sensor system as described herein generally samples air that passes the external surface of the mobile platform on which the sensor system is mounted at some distance, for example about a centimeter, away from the surface. At this distance in the boundary layer, friction can have a significant but not overwhelming effect. In general, the effect of friction can be isolated through design features and thermal insulation of the measurement cell area. Thus isolated, the effect of friction can then be modeled as a function of Mach number for a fast moving mobile platform such as an aircraft. Friction can be less important for slower moving mobile platforms.

Modeling of the effects of friction on the measured air temperature can be accomplished using computers, algorithms, and special statistical processes. In one example, the temperature increase or to friction, $T_F$, can be modeled as a function of a polynomial in Mach number:

$$T_F = A_1 + A_2 \cdot M + A_3 \cdot M^2 \quad (1)$$

where M is the Mach number for the moving mobile platform and $A_1$, $A_2$, and $A_3$ are coefficients that can be determined empirically. Equation 1 is a quadratic equation, but higher order polynomials can also be used. The temperature due to friction is equivalent to the observed measured temperature increase $(\Delta T)_{TS}$ relative to a static temperature measurement.

Use of two independent temperature sensors as described herein can provide unique measurements of the static (ambient) temperature, plus the effects of friction. The two measurements can be averaged to a single answer or combined in a more complicated way as desired. In one example, deviations between the measurements obtained from the two sensors can be monitored for use as a quality control measure.

FIG. 1 is a schematic diagram showing a top view of an example of a mobile temperature sensor 100. The sensor 100 can have a body 102 configured to be mounted on an exterior surface of a mobile platform such as for example an aircraft or other vehicle. The body 102 can be comprised of aluminum or some other suitable material that is durable in demanding environments. The direction of travel of the mobile platform is shown by a motion arrow 104. Air flow across the mobile temperature sensor 100 occurs in the opposite direction as indicated by air flow arrows 106. An air intake passage 110 having an air intake inlet 112 pointed toward the direction of movement of the mobile platform through the air and an air intake outlet 114 pointed in the opposite direction is formed by the body 110 to project some distance into the air stream moving across the surface of the mobile platform.

The mobile temperature sensor system 100 can be placed on a mobile platform such as an aircraft or other vehicle in an area of nearly laminar (non-turbulent) flow on the exterior of the mobile platform. One such location on a commercial aircraft can be on the exterior fuselage of the aircraft, such as for example adjacent to or forward of the cockpit. A ring or insert made of a durable material, such as for example stainless steel can optionally be included to form the entrance to the air intake inlet 112 to help maintain the life of the mobile temperature sensor system. Sensors used in jet aircraft applications can be designed with greater than 20 year operational life expectancies.

Figure 2:
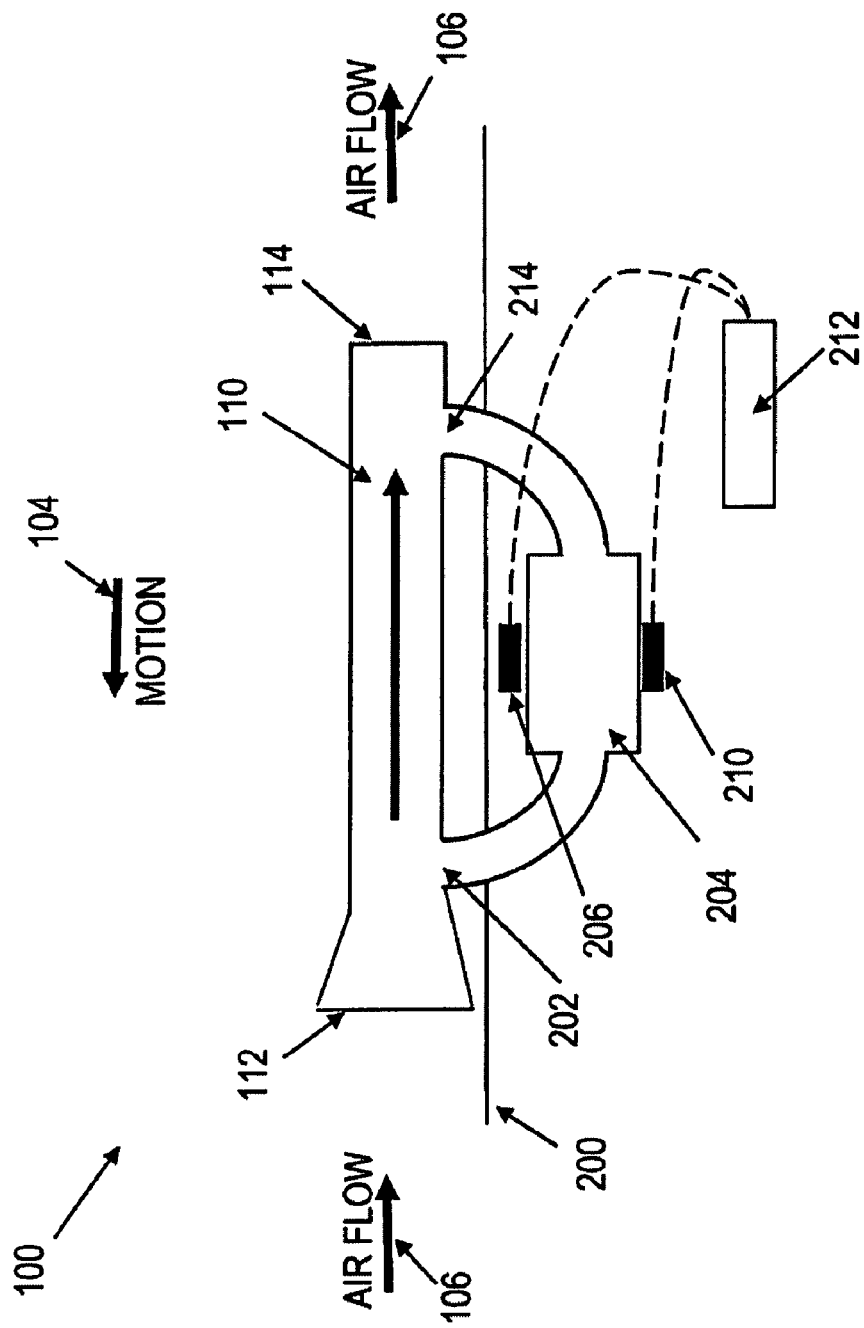
FIG. 2 is a schematic diagram showing a side cross-sectional view of a mobile temperature sensor system.

FIG. 2 shows a side view of a mobile temperature sensor 100 mounted to an exterior surface 200 of a mobile platform in cross section. Air is directed through the air intake passage 110 via the air intake inlet 112. An air sampling vent 202 within the air intake passage 110 diverts some of the air passing through the air intake passage 110 to a measurement cell 204. A first sensor element 206 and a second sensor element 210 are mounted to or within the walls of the measurement cell 204 to sense the air temperature and transfer temperature signals to a control circuit 212. Air passes out of the measurement cell 204 via an air sampling outlet 214 and back into the air intake passage 110 which vents to atmosphere via the air intake outlet 114.

The temperature measurements provided by the first sensor element 206 and the second sensor element 210 can be kept consistent and accurate using features of the control circuit 212 as described in greater detail below. The functions and components of the control circuit 212 can be distributed in various locations within the vehicle or mobile platform on which the sensor system 100 is mounted. The control circuit 212 can also receive Mach number information (and possibly pressure information), such as for example from a Pitot tube on an aircraft, for further use in calculating the correct ambient atmospheric temperature. This information can also optionally be obtained over a standard communication link, such as for example from a ground-based air traffic controller.

The first sensor element 266 and second sensor element 210 can be platinum-resistance-thermometers (PRTs) or other comparable temperature sensors, such as for example other resistance temperature detectors (RTDs), thermocouples, and resistors. A PRT can be capable of reproducible temperature measurements with very high accuracy, for example approximately ±0.1 degrees centigrade or better. The first sensor element 206 and second sensor element 210 can optionally be positioned opposite or approximately opposite one another in the measurement cell 204. For example, if the first sensor element 206 and second sensor element 210 can be positioned at opposite ends of a chord line passing through a central axis of the measurement cell 204. For a cell with a rectangular cross section, the first sensor element 206 and second sensor element 210 can be positioned on opposite walls of the measurement cell 204. In one variation, the first sensor element 206 and second sensor element 210 can be recessed or otherwise the embedded within the walls of the measurement cell 204 by some distance such that the first sensor element 206 and second sensor element 210 are not directly exposed to the air passing through the measurement cell 204. Such a configuration can provide a substantial improvement in the lifetime of the sensor elements, and thus the reliability and durability of the sensor system by isolating the first 206 and second 210 sensor elements from the atmosphere which can degrade the performance of the sensors over time. The distance by which the first sensor element 206 and second sensor element 210 are recessed or embedded can in one variation be in a range of approximately 5 to 100 microns and in another variation approximately 80 microns.

The air passage 110 and/or the air passage inlet 112 can include one or more aerodynamic features that can act as an inertial separator that removes particles more dense than air that might interfere with or otherwise degrade conditions for temperature sensing in the measurement cell 204. Undesirable particles can include new snow, which is generally a factor of 10 more dense than water vapor; snow crystals, which are generally a factor of 100 more dense; aerosols, which can be up to 1000 times more dense, and various biological entities, such as for example insects, bird entrails, and the like. The removal of the above particles can be beneficial in extending the useful lifetime of a mobile temperature sensor system. In one variation, an aerodynamic taper in the air intake passage 110 can accelerate an incoming flow of M=0.6 to a value of M=0.72 using an area ratio, R, given by $$A_{Input}/A_{Throat}=1.10 \qquad (2)$$

where $A_{Inlet}$ is the cross sectional flow area of the air intake passage inlet 112 inlet and $A_{Throat}$ is the cross sectional flow area of the body of the air intake passage 110. The area ratio, R, can be reduced to 1.05 in one example to reduce the necessary cooling correction. This cooling effect can be calculated very accurately as a function of Mach number using standard equations for compressible flow.

Figure 3:
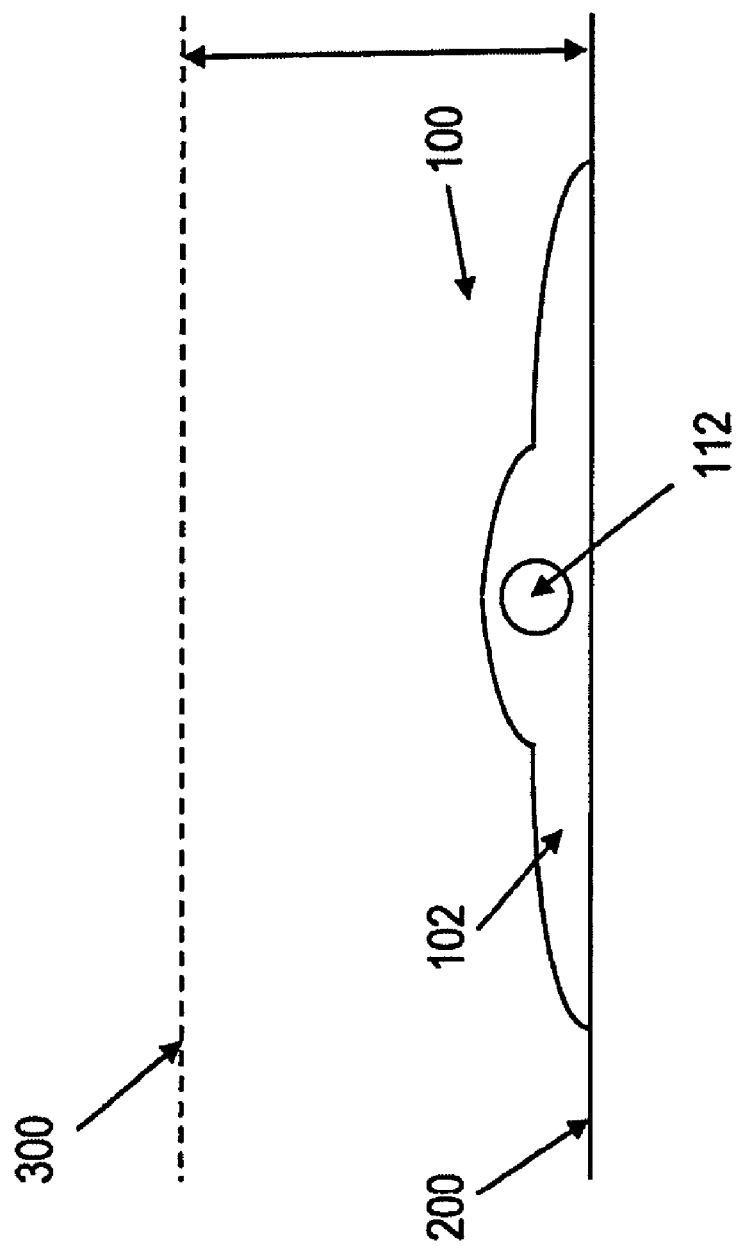
FIG. 3 is a schematic diagram showing a front view of a mobile temperature sensor system.

FIG. 3 is a schematic diagram showing a front view of a mobile temperature sensor system 100 mounted to an exterior surface 200 of a mobile platform. FIG. 3 also shows the height of the boundary layer 300 formed above the exterior surface 200 as the mobile platform moves through the air. As shown, the mobile temperature sensor system 100 protrudes into the boundary layer but not outside of it as do currently available TAT sensors.

Figure 4:
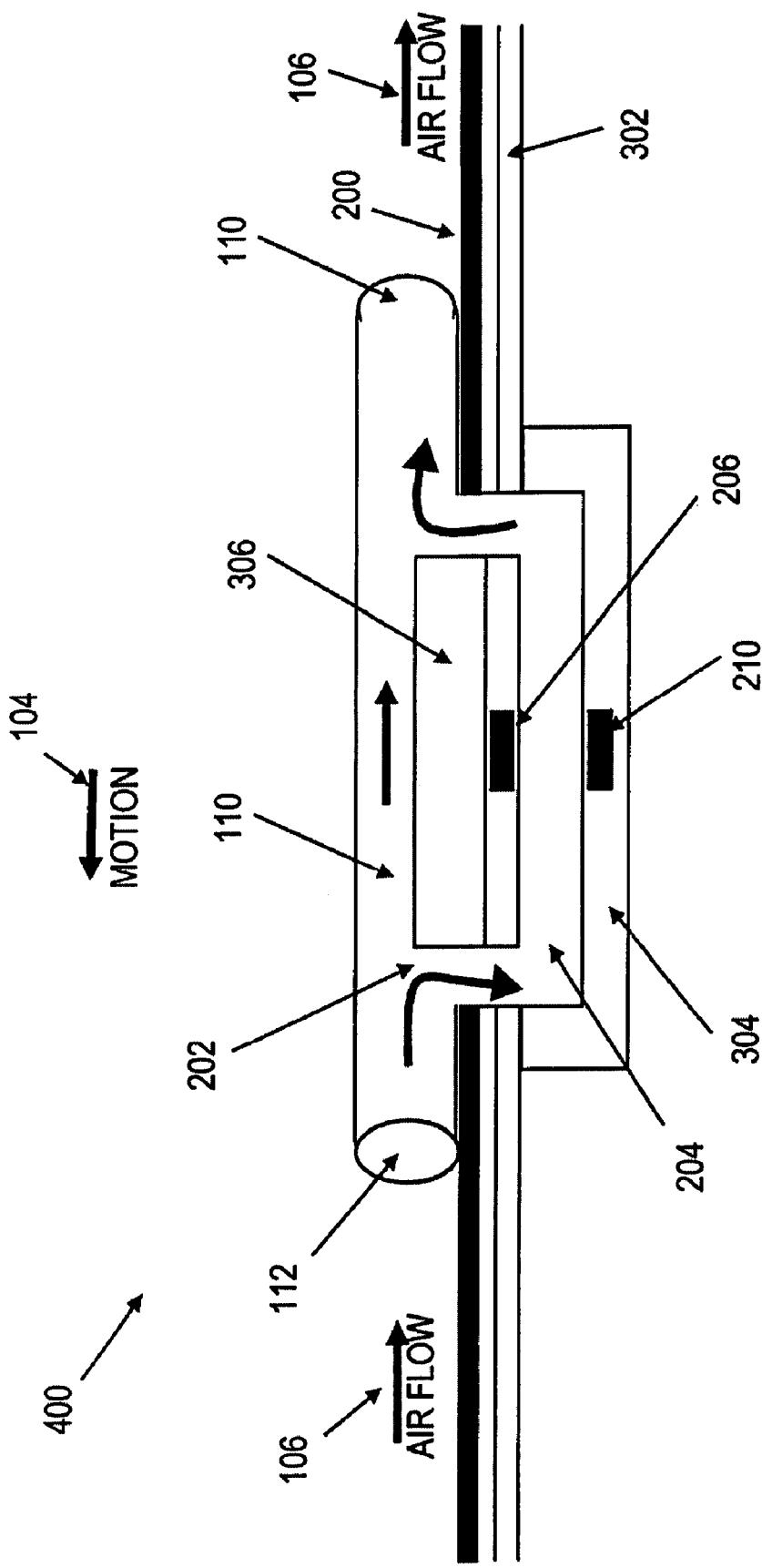
FIG. 4 is a schematic diagram showing a side cross-sectional view of an alternative mobile temperature sensor system.

FIG. 4 is a schematic diagram showing a cross-sectional side view of an alternative configuration for a mobile temperature sensor system 400. This sensor system 400 includes similar features to the sensor system shown in FIG. 1 through FIG. 3, including a air intake passage 110 with an inlet 112 and an outlet 114 as well as a measurement cell 204 and a first sensor element 206 and a second sensor element 210. In the example of FIG. 4, the device is mounted to a doubler/filler plate 302 of an aircraft or other mobile platform. An insulating layer 304 is provided around the measurement cell 204 to reduce the impact of other heat or cooling sources on the temperature measurement. Insulation can optionally be used in mobile temperature sensor systems such as disclosed herein. A flow barrier or flow enhancer 306 projects into the air intake passage 110 to optionally provide an inertial separation effect such as was described above for the aerodynamic throat configuration. Air entering the air intake passage 110 via the inlet 112 is accelerated by a reduction in cross sectional area. Denser particles are swept with the higher velocity air while air molecules are conducted into the measurement cell 204. The flow enhancer 306 can be a surface that helps direct some flow into the air sampling vent 202. The flow enhancer 306 can optionally be a rectangular block placed on the bottom of the air intake passage 110 or it can optionally be formed integrally as part of the extruded air intake passage 110.

A single voltage reference can optionally be used for the temperature sensor bias circuitry, operational amplifier reference voltages, and the analog-to-digital converter (ADC) reference. By making all measurements ratio metric, the influence of drift in the primary reference voltage on the temperature measurement can be reduced or eliminated, thereby providing the benefit of improved accuracy over wide ranges in ambient temperature.

Insulator construction for a mobile temperature sensor such as described herein can include one or more beneficial features. A structural material can be used which not only serves as the insulator, but that can also support the measurement cell 204. Alternatively, a supporting structure filled with an insulating filler material can be used. A wide range of suitable filler insulators can be used, including but not limited to aerogel, various styrofoams and polystyrenes, and many others which have low thermal conductivities (as low as 0.01 W/m-K for aerogel). Use of an insulator that is structural allows simplification of the design and assembly (fewer parts). Adjusting the thickness of the insulator can achieve the required thermal isolation from the measurement cell surroundings.

Glass-epoxy composites are a commonly used material in aircraft construction. G10, FR4, and garolite are common trade names for one particular category of such composites which are lightweight, strong, easy to machine and have low thermal conductivities (0.27 W/m-K, typically). A suitable thickness of G10 (such as for example approximately 0.5") or a similar material can be used to provide thermal insulation for the measurement cell and to isolate the mobile temperature sensor system on the side facing the interior of the fuselage of the mobile platform. Such a configuration allows the temperature sensor system to be influenced solely by the walls of the measurement cell 204 to which they are in close proximity. The thickness of aluminum or other material form which the measurement cell 204 is constructed can be kept very small to maximize temperature equilibrium between air in the measurement cell 204 and the first sensor element 206 and the second sensor element 210. In one example, the thickness between the sensor elements and the interior of the measurement cell 204 can be approximately 0.005" or less. By minimizing the thermal isolation of the sensor elements 206, 210 form the interior of the measurement cell 204, the temperatures measured by the sensor elements 206, 210 depend strongly on the temperature of the measurement cell 204 walls, which in turn is controlled by convection (air flow through the measurement cell) and conduction to the surroundings through the measurement cell 204 mounting structures and interfaces.

The thermal resistance between the sensor elements and the air inside the measurement cell is determined by the casing material used in sensor element construction, and the thickness of the measurement cell 204 wall material between the sensor elements and the interior of the measurement cell 204. Similarly, the thermal resistance between the sensor elements and the interior area of the fuselage is determined by the casing material used in the sensor element construction and the material and thickness of the insulator 304. A simple one-dimensional calculation ignoring the sensor element casing material (which is very thin with a high thermal conductivity, and is present on both sides of the sensor element) using 0.005" thickness of an aluminum measurement cell 204 wall (thermal conductivity 205 W/m-C), and 0.50" thickness of the G10 insulator (thermal conductivity 0.27 W/m-C), can be used to estimate the thermal resistance on each side of the sensor element. Thermal resistance is defined as $$R_T = L/(kA) \quad (3)$$

where L is the material thickness, k is the thermal conductivity, and A is the cross sectional area. For square thin-film PRT elements (2×2 mm is typical), A=4.0e-6 m². The values for thermal resistance on each side of the PRT elements are as follows: PRT to measurement cell air flow is 1.27e$^{-4}$ m/(205 W/m-C*4e-6 m²) which equals 0.155° C./W; and PRT to fuselage interior is 1.27e$^{-2}$ m/(0.27 W/m-C*4e-6 m²) which equals 11759° C./W These are static thermal resistance values and do not yet consider convection, which dominates when there is air flow through the measurement cell 204 and further ensures that the sensor elements 206, 210 follow the temperature of the measurement cell walls to which they are tightly coupled thermally. Nonetheless, these calculated values indicate that the thermal resistance between the sensor elements 206, 210 and the fuselage interior is nearly five orders of magnitude (75865 times) larger than the thermal resistance between the sensor elements 206, 210 and the measurement cell 204 interior. Thus, we have extremely low thermal resistance between the sensor elements 206, 210 and the measurement cell 204 walls, and extremely high thermal resistance both between the sensor elements 206, 210 and the fuselage interior, and between the measurement cell 204 and the air sampler interior base to which it is mounted (also via a 0.5" thick G10 insulator). As an additional practical point, note that the thermal resistance numbers above give the heat flow across the interface required to change the temperature by 1° C. Heat flow is defined as Q=dT/$R_T$, where dT is the temperature difference across the interface. To change a sensor element temperature by 0.1° C. across the 0.5" G10 insulator would require a heat flow across the interface of 1176 W, or a temperature difference across the interface of dT=Q$R_T$=1383° C. In general, such temperatures do not exist in normal conditions on an aircraft. In summary, the measurement cell containing the temperature sensors is sufficiently insulated to isolate the effects of friction.

Ambient temperature measurement are generally not required by aircraft except when the aircraft is in motion. In some examples, however, a measurement can be required when the mobile platform or vehicle on which a mobile temperature sensor is mounted is stationary. For example, an aircraft may need an air temperature measurement when it is on the ground just prior to departure. When the mobile temperature sensor is moving relative to the ambient air, there is sufficient conductivity between the thin walls of the measurement cell, which as noted above can be made out of aluminum or other thermally conductive material, and the sensor elements to ensure that the each sensor element provides a measurement of the temperature of the air flowing through the measurement cell. In the event that a temperature measurement is or might be required while the mobile temperature sensor is stationary, an aspiration capability can be incorporated into the mobile temperature sensor to enable stationary air temperature measurements. In one example, the measurement cell can optionally be aspirated using a mechanism or technique that draws ambient air through the measurement cell to avoid heat buildup (in a hot environment) or cold sinking (in a cold environment) and thereby to insure a proper measurement. Air flow through the air intake passage can be forced by a variety of techniques, including but not limited to a valve and fan assembly or a convection-based assemblies.

Figure 5:
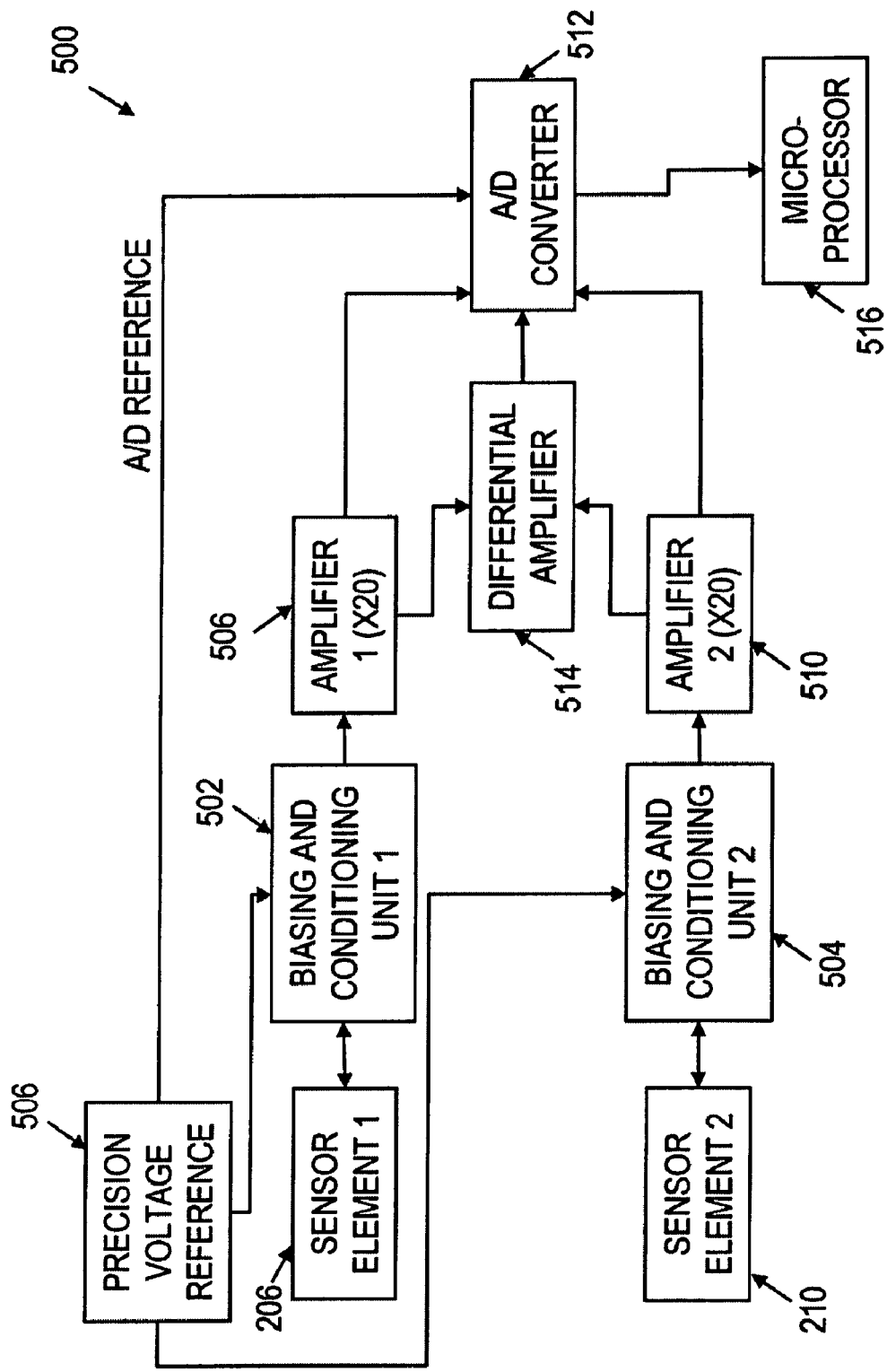
FIG. 5 is a box diagram showing elements of a control circuit for a mobile temperature sensor system.

FIG. 5 shows a functional block diagram of a control circuit 212 that can be used in conjunction with the current subject matter. The first sensor element 206 and the second sensor element 210 can be separately biased with a precise current by a first sensor biasing and conditioning unit 502 and a second sensor element biasing and conditioning unit 504, respectfully, that generate a voltage proportional to the resistance observed at each sensor element. These voltages are proportional to temperature based on a well-defined resistance versus temperature curve for the PRT. The bias current from the first sensor element biasing and conditioning unit 502 and the second sensor element biasing and conditioning unit 504 can optionally be in the range of approximately 80 micro amps to 800 micro amps for a 1000 ohm (at 0° C.) to a 100 ohm PRT element. Use of a low bias current produces a low power input, in one example less than approximately 7 microwatts, to the first 206 sensor element and second sensor element 210, thereby reducing self-heating effects that could introduce errors into the temperature measurements. In the example of FIG. 5, a single, precision voltage reference 506 is used to reduce drift for the first sensor element biasing and conditioning unit 502 and the second sensor element biasing and conditioning unit 504. The precision voltage reference 506 also provides a voltage reference for a first operational amplifier 506 that amplifies the signal from the first sensor element biasing and conditioning unit 502 and a second operational amplifier 510 that amplifies the signal from the second sensor element biasing and conditioning unit 504. The precision voltage reference 506 further provides a voltage reference to an analog to digital converter (ADC) 512 that can optionally be a 16-bit ADC. By referencing all temperature measurements in the sensor system to a single voltage reference source 506, the effects of drift in the primary reference voltage can be reduced or even eliminated, thereby improving accuracy over wide ranges in ambient temperature.

Voltages across the first sensor element 206 and the second sensor element 210 are be amplified by a first operational amplifier 506 and a second operational amplifier 510. The amplifier gain for each of these amplifiers can optionally be approximately 20 times as shown in FIG. 5 or can be another gain value chosen according to system requirements. Conditioning circuitry as described above as well as low-pass filters and the like can be used to produce voltage signals at the input of the analog to digital converter 512 that utilizes the full voltage input range of the ADC 512. A third signal conditioning stage can comprise a differential amplifier 514 that receives the individual amplified and conditioned voltages from the first sensor element 206 (via the first biasing and conditioning unit 502 and the first operational amplifier 506) and the second sensor element 210 (via the first biasing and conditioning unit 502 and the first operational amplifier 506) and provides a differential output with an additional further gain. In one example, this additional gain from the differential amplifier 514 can be approximately 50 times. The signal from the differential amplifier 514 can also be monitored by the ADC 512 to allow a precise measurement of the difference between the first sensor element 206 and the second sensor element 210 for use in various diagnostic procedures.

The control circuit 500 can also contain a processor 516 that can be a microprocessor that compensates for the frictional heating component using equation 1 as described above. The ambient temperature $T_A$ can be obtained from the measured temperature by subtracting the frictional temperature, $T_F$. The coefficients $A_1$, $A_2$, and $A_3$ can be obtained through modeling of empirical data using an appropriate method such as for example least squares. Other software options can include the use of singular value decomposition (SVD), and other special mathematical techniques to maximize performance.

Figure 6:
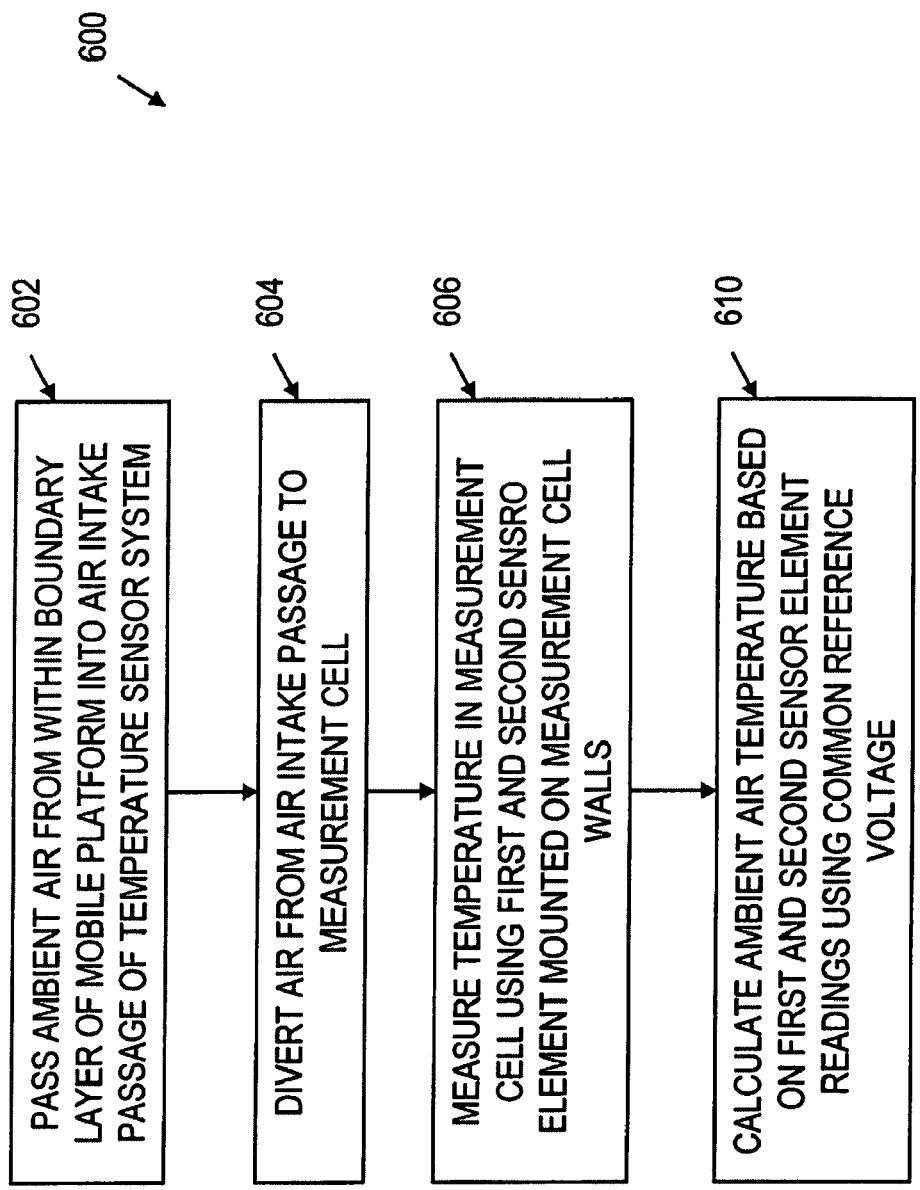
FIG. 6 is a process flow diagram illustrating a method for measuring the ambient air temperature experienced by a mobile platform.

In another implementation, the ambient air temperature can be measured using a method as shown in the process flow chart 600 of FIG. 6. At 602, air is passed into an air intake passage 110. A sample stream of the air in the air intake passage is diverted at 604 into a measurement cell 204 that includes a first sensor element 206 and second sensor element mounted on or in walls of the measurement cell 204. The first and second sensor elements measure the temperature in the measurement cell at 606 and provide signals to a control circuit that are proportional to the measured temperatures. These measured temperatures are used to calculate the ambient air temperature using a common reference voltage for the two temperature measurements that can reduce or eliminate sensor drift and improve accuracy.

The subject matter described herein may be embodied in systems, apparatus, methods, and/or articles depending on the desired configuration. In particular, various aspects of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although a few variations have been described in detail above, other modifications, additions, and implementations are possible are within the scope and spirit of the disclosed subject matter. Features implementing functions may also be physically located at various positions, including being distributed such that portions of functions are implemented at different physical locations. Further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results.

What is claimed is:

1. An apparatus comprising:
   an air intake passage comprising an air intake inlet configured to admit ambient air into the air intake passage;
   a measurement cell through which air from within the air intake passage is diverted;
   a first sensor element disposed within the measurement cell at a first location along an interior surface of the measurement cell, the first sensor element providing a signal that is related to a first temperature measured by the first sensor element, the first sensor element being recessed beneath the interior surface;
   a second sensor element disposed within the measurement cell at a second location along the interior surface of the measurement cell, the second location being at least approximately opposite to the first location across an interior volume of the measurement cell, the second sensor element providing a signal that is related to a second temperature measured by the second sensor element, the second sensor being recessed beneath the interior surface;
   a control circuit configured to receive the first signal and the second signal and to calculate an ambient air temperature of the ambient air admitted into the air intake passage; and
   a thermally insulating layer disposed around the measurement cell to thermally isolate the measurement cell from a mobile platform comprising an exterior surface adjacent to which the air intake inlet is disposed; wherein the mobile platform is an aircraft.

2. An apparatus as in claim 1, wherein the first sensor element and the second sensor element are platinum resistance thermometers.

3. An apparatus as in claim 1, wherein the measurement cell is constructed of aluminum.

4. An apparatus as in claim 1, wherein the control circuit comprises:
   a first biasing and conditioning unit that conditions and biases the first signal;
   a second biasing and conditioning unit that conditions and biases the second signal; and
   a reference voltage source that normalizes the voltages of the first and the second biasing and conditioning units.

5. An apparatus as in claim 1, further comprising an air sampling vent configured to divert the air from within the air intake passage to the measurement cell.

6. An apparatus as in claim 1, wherein the first sensor element is recessed beneath the interior surface and the second sensor is recessed beneath the interior surface, each by a distance that is in a range of approximately 5 to 100 microns.

7. An apparatus as in claim 1, wherein the first sensor element is recessed beneath the interior surface and the second sensor is recessed beneath the interior surface, each by a distance of approximately 80 microns.

8. An apparatus as in claim 1, wherein the first sensor element and the second sensor element are recessed beneath the interior surface such that the first sensor element and the second sensor element are not directly exposed to the ambient air admitted into the air intake passage.

9. An apparatus comprising:
   an air intake passage comprising an air intake inlet configured to admit ambient air into the air intake passage, the air intake inlet being positioned proximate to an exterior surface of a mobile platform such that ambient air from within a boundary layer of the ambient air adjacent to the exterior surface passes into the air intake passage wherein the mobile platform is an aircraft;
   a measurement cell through which air from within the air intake passage is diverted;
   a first sensor element disposed within the measurement cell at a first location along an interior surface of the measurement cell, the first sensor element providing a signal that is related to a first temperature measured by the first sensor element, the first sensor element being recessed beneath the interior surface;
   a second sensor element disposed within the measurement cell at a second location along the interior surface of the measurement cell, the second location being at least approximately opposite to the first location across an interior volume of the measurement cell, the second sensor element providing a signal that is related to a second temperature measured by the second sensor element, the second sensor is recessed beneath the interior surface; and a control circuit configured to receive the first signal and the second signal and to calculate an ambient air temperature of the ambient air admitted into the air intake passage.

* * * * *